United States Patent [19]

Kosugi et al.

[11] 3,723,822

[45] Mar. 27, 1973

[54] CIRCUIT BOARD PANEL FRAME CONSTRUCTION

[75] Inventors: Takashi Kosugi; Hiroyuki Abe; Hisao Sudo, all of Tokyo, Japan

[73] Assignee: Nippon Electric Company, Limited, Tokyo, Japan

[22] Filed: Sept. 20, 1971

[21] Appl. No.: 181,902

[30] Foreign Application Priority Data

Sept. 21, 1970 Japan ................................45/83127

[52] U.S. Cl. ..............................317/101 DH, 211/41

[51] Int. Cl. ................................................H02b 1/02

[58] Field of Search ...................317/101 DH; 211/41

[56] References Cited

UNITED STATES PATENTS 3,511,385 5/1970 Ayling ..........................317/101 DH 3,026,453 3/1962 Marks ..........................317/101 DH

FOREIGN PATENTS OR APPLICATIONS 1,429,670 1/1969 Germany ...............................211/41

897,174 5/1962 Great Britain ................317/101 DH 64,493 11/1968 Germany ...............................211/41

*Primary Examiner*—David Smith, Jr.

*Attorney*—Richard C. Sughrue et al.

[57] ABSTRACT

A frame assembly for mounting a plurality of plug-in circuit board panels includes a frame with a top and base member having engagement edges. Front and rear supporting bars are held in position by the engagement edges at any desired point in the frame, thereby permitting expansion of the panels in accordance with demand. Guide plates having grooves and central cooling apertures support the panels, and in turn, are supported by the front and rear supporting bars.

1 Claim, 3 Drawing Figures

CIRCUIT BOARD PANEL FRAME CONSTRUCTION

BACKGROUND OF THE INVENTION

1. Field of the Invention

The present invention relates to a circuit board panel frame construction particularly adapted for use in the field of communication equipment and the like.

2. Description of the Prior Art

As a result of advancement in the field of miniaturization of transistorized circuits and associate parts in recent years, a large scale commercialized use of circuit boards has become possible. The transistorized circuit boards have the capability of performing the same or greater circuit functions, than those of the conventional devices, such as tubes and the like, which they have replaced. In addition, the circuit boards have permitted a remarkable reduction in the space formerly occupied by the conventional devices.

As a result of the widespread use of these circuit boards in the form of modules or panels, a requirement has developed of providing frame constructions for mounting the circuit board panels in a convenient and functional manner. For example, the conventional frame construction utilized in communication equipment, generally comprises a framework of a predetermined size, provided with longitudinally or laterally elongated integral box-like cases, which can be constructed by either welding or a screw and bolt assembling method. Mounted within the conventional frame construction, are generally separate sub-system units of printed circuit board panels, each sub-system being separate and having its own electrical connections to outside cables at some predetermined position, e.g., at the upper, lower, left side or right side portion of each integral box-like case. In other words, the electrical connections are generally formed at the specific positions relative to the box-like case. The use of separate integral sub-system units, facilitates the repairing of any faulty unit or component.

In the conventional frame constructions, utilized for carrier transmission and other communication systems, each circuit panel is generally separated from the other in the sub-system units. This preferred arrangement, however, results in a need for providing constructional housing members of various sizes to accommodate the variations in the sub-system units. Accordingly, manufacturing and assembling of various parts of various sizes, are generally required with an accompanying increase in packaging and transportation costs.

In addition, because these conventional frame units are generally integral box-like structures, the heat generated by various electrical parts will not have suitable outlets, thereby causing a temperature rise in the structure with a consequential impairment of the performance of the electrical circuitry.

SUMMARY OF THE INVENTION

The present invention is directed at providing improved frame construction housing suited for the optimum use of miniaturized circuit equipment. As a result of the present invention, the miniaturized circuit assemblies in the form of panels in each sub-system unit can be installed independently, both electrically and mechanically and can be varied in number in accordance with the demand of a particular sub-system circuit function. Thus, the present invention makes it possible to realize an economical assembling of communication frame units. The frame units of the present invention are adjustable to accommodate various size subsystem units and are quite capable of being expanded to increase the capacity of any particular frame construction.

DESCRIPTION OF THE PREFERRED EMBODIMENT

Figures 1, 2, 3:
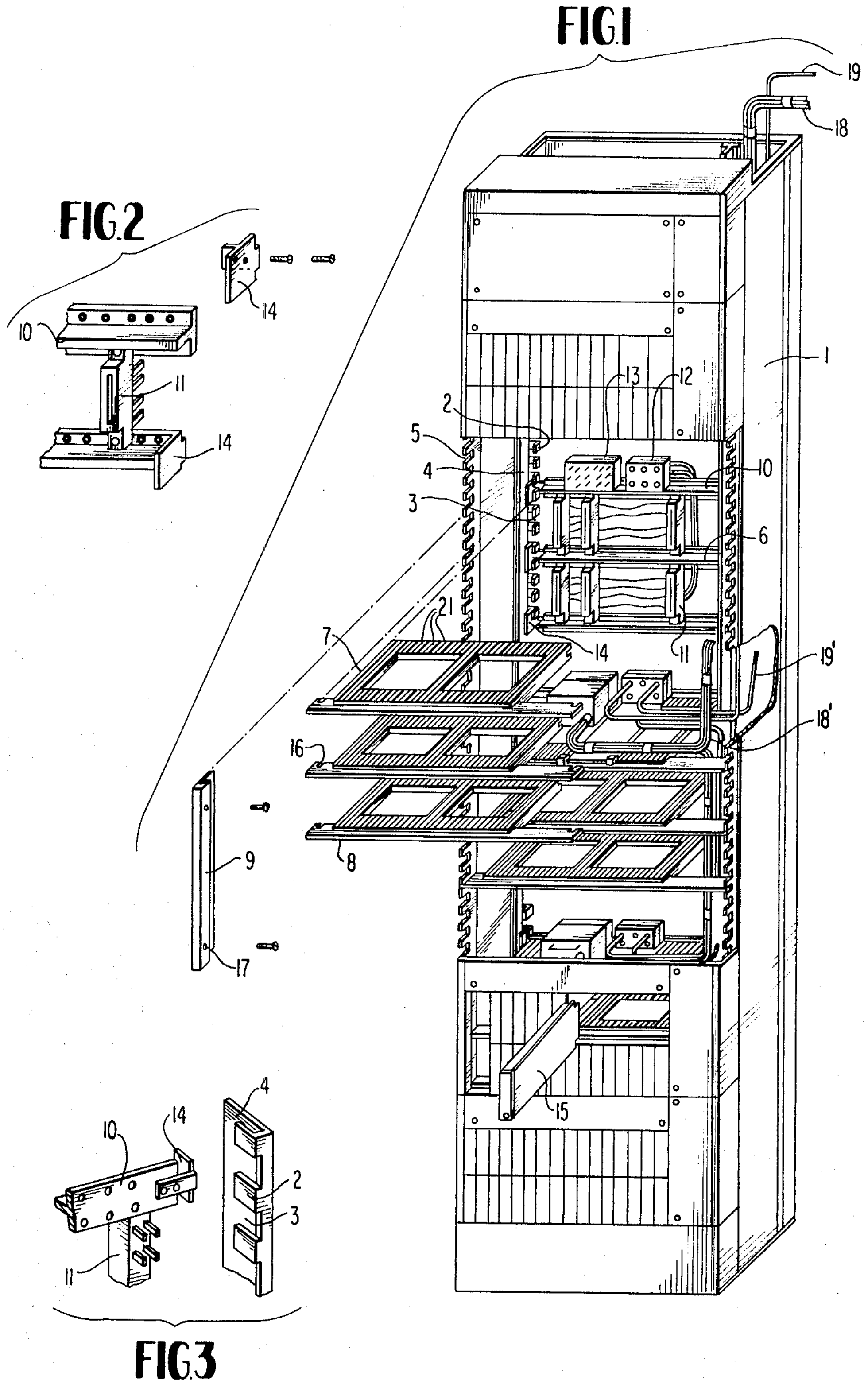
FIG. 1 is a perspective view of a frame construction for circuit board modules according to the present invention.
FIG. 2 is a partial perspective view of a socket supporting bar for the circuit board modules or panels of the present invention.
FIG. 3 is another partial perspective view of the socket supporting bar of the present invention.

Referring to the Figures, in particular FIG. 1, there is provided a frame construction unit 1 for housing circuit board modules or panels. The frame construction unit 1 is basically the substructure onto which the components of the present invention are added. The frame unit 1 has on both sides of its inner rear portion, side plates 4 that are formed with protrusions 2 and recessions 3 arranged alternately at suitable intervals. In addition, the frame unit 1 also has indentations 5 arranged at suitable intervals along both front edges.

Each independent group of circuit board panels or modules in a sub-system unit utilizes a lumped socket mounting beam 6, a guide plate 7, with grooves 21 positioned on its sides, a circuit unit supporting beam 8, and a covering plate 9, adapted to secure the supporting beam 8. These component parts are repetitively used for each sub-system unit in the frame unit 1, and can be transported separately to the site of installation. The lumped socket mounting beam 6 comprises socket supporting bars 10 that permit the arrangement of the sub-system units to be mounted in parallel. A plurality of sockets 11 are fixed by screws, or other suitable means, to the supporting bars 10. The lumped socket mounting beam 6 is provided with wire connections for the sockets 11 for connecting both the circuit panels and wire connections between various sockets.

A socket 12 is provided for connection with an outside coaxial cable, while sockets 13 are provided for electrical connection with outside pair cables.

At both ends of each socket supporting bar 10 are attached brackets 14 adapted to fit in the recesses 3 of the side plates 4. A plurality of socket supporting bars 10 may be utilized in any particular frame unit to meet the particular demands of the required installation. Sockets 11 corresponding to the plug-in module or panel units of a desired circuit board arrangement, may be added with appropriate wiring in the lumped socket mounting beam 6.

Each guide plate 7 carries on its surfaces side grooves 21 arranged at suitable intervals for guiding the plug-in panels or modules 15 of the sub-system unit. The guide plate 7 carries at its rear portion, positioning supporting means for fitting into the sockets of the supporting bars 10. As a possible modification, the positioning and supporting may be accomplished by providing a plurality of projections at the rear portion of each guide plate 7, while providing corresponding holes in the socket supporting bars 10, whereby the projections of the guide plate 7 would fit the corresponding holes. The front portion of each guide plate 7 is formed with a U-shaped recession in which the circuit unit supporting beam 8 can be tightly fitted. Each guide plate 7 is generally made by a plastic or aluminum die casting. Since the guide plate 7 is only required to serve the function of guiding the plug-in panels 15, the central portion of each guide plate 7 may be extensively removed, thereby allowing a sizable reduction of the material costs, and providing better heat dispersing properties. At both ends of the circuit unit supporting beam 8, are provided indentations 16, adapted to fit with the corresponding indentation 5, mounted on the front of the frame unit 1. A substantially cross-sectionally U-shaped covering member 9, having holes 17, is adapted to secure the circuit unit supporting beam 8 to the frame unit 1.

In assembling the housing at the site of the installation, the lumped socket mounting beams 6 are installed in the inner rear portion of the frame unit 1, and then the brackets 14, connected to the socket supporting bars 10, are fitted in the recesses 3 to secure the assembly to the frame unit 1. The guide plates 7 are then fitted in the frame unit 1 and combined with the corresponding circuit unit supporting beams 8, the rear portion of the guide plates 7 are fitted in the socket supporting bars 10 of the mounting beams 6, by the appropriate positioning supporting means. The circuit unit supporting beam 8, with its indented ends 16, is fitted in the corresponding indentations 5, arranged at the front of the frame unit 1. Generally, the lumped socket mounting beam 6, guide plate 7, and circuit unit supporting beams 8 can be fastened to the frame unit 1, by screws or other means so that they will not slip out from the frame unit 1. Electrical connections are accomplished by connecting the sockets 12 and 13 at the upper part of each socket mounting beam 6, with their plugs attached to the ends of the outside cables 18 and 19. The covering plate 9 secures or locks the circuit unit supporting beam 8 and guide plate 7 into position.

The connections with the external cables are provided at the top of each lumped socket mounting beam 6. However, if spaces for the plug-in panels are needed in the vertical direction of the frame unit 1, the electrical connections may be disposed at both sides, or one side, of the sockets 11. In addition, the external linking cables need not pass through just one side, but can instead, pass through both sides of the frame unit 1. The terminals of the sockets 11 may be connected directly with the cables 18, 19, 18' and 19', before the lumped socket mounting beam 6 is mounted on the frame unit 1. If the external cables are to be connected directly with the sockets 11, electrical sockets 12 and 13 are not necessary. If this is the case, it makes it possible to dispense with the spaces that are generally required for electrical connections in the vertical direction.

As a result of the present invention, housing units for circuit assemblies of various sizes can be manufactured with ease and at relatively low costs. The packages required for transporting the components in the form of separate parts can be minimized with a corresponding ease of handling.

In addition, the assembly operation at the construction site is greatly facilitated, since the assembling of the component elements into the frame unit, has been greatly simplified. Finally, the heat dissipating ability of the frame unit has been greatly improved with a corresponding improvement in the electrical circuit performance, while the electrical connections can be accomplished with ease, either at the top, side or sides of each circuit unit.

Although the above description of the invention is the preferred embodiment, it is obvious that various modifications can be accomplished by one skilled in the art and accordingly, the scope of the present invention should be measured solely from the following claims.

What is claimed is:

1. A frame assembly for mounting a plurality of plug-in panels to form an electrical component sub-system for communication equipment and the like comprising:

frame means including a base member, a top member and side members extending therebetween;

at least one first supporting bar removably mounted on said frame means and extending between said side members;

at least one second supporting bar removably mounted on said frame means and extending between said side members;

at least one guide plate mounted on said first and second supporting bars and capable of supporting a plurality of plug-in panels to form an electrical component sub-system within the frame means;

socket means for providing electrical power to the plug-in panels;

said side members having engagement means along the entire length of the forward edges thereof enabling said second supporting bar to be located at substantially any position on said frame means;

said first supporting bar having a T-shaped cross section and flat plates extending from each end of the bar perpendicular to the longitudinal axis of the bar for engagement with the side members of said frame means; and said side members both having a series of L-shaped projections along the rear edges thereof adapted to inter-engage the flat plates of said first supporting bar whereby said first supporting bar can be positioned at substantially any location along said side members.

* * * * *